(12) United States Patent
Zywicki

(10) Patent No.: US 10,616,461 B2
(45) Date of Patent: Apr. 7, 2020

(54) BROADBAND OPTICAL SYSTEMS AND METHODS

(71) Applicant: RAYTHEON COMPANY, Waltham, MA (US)

(72) Inventor: Randall W. Zywicki, McKinney, TX (US)

(73) Assignee: RAYTHEON COMPANY, Waltham, MA (US)

(*) Notice: Subject to any disclaimer, the term of this patent is extended or adjusted under 35 U.S.C. 154(b) by 464 days.

(21) Appl. No.: 15/496,345

(22) Filed: Apr. 25, 2017

(65) Prior Publication Data

US 2018/0307053 A1    Oct. 25, 2018

(51) Int. Cl.
| | |
|---|---|
| *G02B 5/20* | (2006.01) |
| *H04N 5/225* | (2006.01) |
| *H04N 5/33* | (2006.01) |
| *G02B 17/08* | (2006.01) |

(52) U.S. Cl.
CPC ........... *H04N 5/2258* (2013.01); *G02B 5/201* (2013.01); *G02B 17/0896* (2013.01);
(Continued)

(58) Field of Classification Search
CPC ............... G02B 17/0896; G02B 5/201; G02B 17/0816; G02B 5/208; G02B 17/08; G02B 5/20; H04N 5/2258; H04N 5/332
See application file for complete search history.

(56) References Cited

U.S. PATENT DOCUMENTS

| | | | | |
|---|---|---|---|---|
| 4,003,635 A | * | 1/1977 | Ottersberg | G01S 17/08 |
| | | | | 359/587 |
| 4,679,068 A | * | 7/1987 | Lillquist | H04N 5/332 |
| | | | | 250/332 |

(Continued)

FOREIGN PATENT DOCUMENTS

EP      1736750 A1    12/2006

OTHER PUBLICATIONS

International Search Report and Written Opinion for application No. PCT/US2018/019459 dated May 9, 2018.

*Primary Examiner* — William R Alexander
*Assistant Examiner* — Balram T Parbadia
(74) *Attorney, Agent, or Firm* — Lando & Anastasi, LLP

(57) ABSTRACT

Aspects and examples are generally directed to broadband optical systems and methods for collecting a wide spectral range of electromagnetic radiation with a single window optical assembly. In one example, a broadband optical system includes a segmented window positioned to receive electromagnetic radiation, the segmented window including at least a first segment formed from a first material and a second segment formed from a second material, the first segment being configured to transmit a first spectral band of the electromagnetic radiation along an optical path and the second segment being configured to transmit a second spectral band of the electromagnetic radiation along the optical path. The broadband optical system may include an optical de-multiplexer configured to spatially separate the
(Continued)

first and second spectral bands, and foreoptics interposed between the segmented window and the optical de-multiplexer to direct the electromagnetic radiation from the segmented window to the optical de-multiplexer.

14 Claims, 7 Drawing Sheets

(52) U.S. Cl.
CPC ............ *H04N 5/332* (2013.01); *G02B 5/208* (2013.01); *G02B 17/0816* (2013.01)

(56) References Cited

U.S. PATENT DOCUMENTS

| | | | | |
|---|---|---|---|---|
| 4,746,798 | A * | 5/1988 | Amon | G01J 3/12 250/339.02 |
| 5,225,893 | A * | 7/1993 | Whitney | G01J 3/36 356/407 |
| 5,497,266 | A * | 3/1996 | Owen | G02B 17/0808 348/164 |
| 5,982,497 | A * | 11/1999 | Hopkins | G01J 3/02 250/226 |
| 6,693,561 | B2 | 2/2004 | Kaplan | |
| 2009/0015914 | A1* | 1/2009 | Duncan | B64G 1/105 359/399 |
| 2010/0079884 | A1* | 4/2010 | Gere | G02B 5/20 359/887 |
| 2011/0200319 | A1* | 8/2011 | Kravitz | G03B 17/02 396/333 |
| 2012/0226480 | A1* | 9/2012 | Berkner | G01J 1/0492 703/1 |
| 2013/0044317 | A1 | 2/2013 | Justice et al. | |
| 2014/0152839 | A1* | 6/2014 | Menon | H04N 5/332 348/164 |
| 2014/0192255 | A1* | 7/2014 | Shroff | G01N 21/27 348/362 |

* cited by examiner

BROADBAND OPTICAL SYSTEMS AND METHODS

BACKGROUND

Optical systems exposed to harsh environmental conditions typically include a transparent window of a suitable durability to protect the delicate optical elements of the system (e.g., mirrors or lenses) from the environmental conditions. Exposure to environmental conditions can result in misalignments of the optical elements, among various other undesirable effects on system performance. While providing protection for the more delicate optical elements of an optical system, the availability of materials for an optical window transparent to a wide spectral range is very limited. Consequently, typical broadband optical system designs require a compromise between spectral coverage and system performance.

SUMMARY OF THE INVENTION

Aspects and embodiments are generally directed to broadband optical systems and methods for collecting a wide spectral range of electromagnetic radiation with a single window optical assembly. As discussed in further detail below, examples of the broadband optical systems described herein may include a segmented window that is arranged to receive two or more spectral bands of electromagnetic radiation. In particular, each segment of the segmented window may be optimized for a subset of the electromagnetic spectrum to provide wide spectral coverage without compromising spatial performance and system protection.

Electromagnetic radiation received by each segment of the segmented window may be transmitted along a common optical path and spatially de-multiplexed by an optical de-multiplexer. Accordingly, various aspects and embodiments discussed herein also avoid the insertion losses and thermal background flux that degrades the performance of typical optical systems. Various other benefits and advantages of the broadband optical systems and methods for broadband optical collection discussed herein are described below with reference to the drawings.

According to an aspect, provided is a broadband optical system. In one example, the broadband optical system comprises a segmented window positioned to receive electromagnetic radiation, the segmented window including at least a first segment formed from a first material and a second segment formed from a second material, the first segment being configured to transmit a first spectral band of the electromagnetic radiation along an optical path and the second segment being configured to transmit a second spectral band of the electromagnetic radiation along the optical path, an optical de-multiplexer positioned along the optical path and configured to spatially separate the first spectral band and the second spectral band, and foreoptics interposed between the segmented window and the optical de-multiplexer and positioned to direct the electromagnetic radiation from the segmented window to the optical de-multiplexer.

According to various examples, the segmented window is circular, and the first segment is shaped as an annulus surrounding the second segment. In some examples, the optical de-multiplexer includes a de-multiplex mirror configured to transmit one of the first spectral band and the second spectral band and reflect the other of the first spectral band and the second spectral band. In at least one example, the de-multiplex mirror is an annular mirror having a central aperture, and the annular mirror is positioned to transmit the second spectral band through the central aperture and reflect the first spectral band. In another example, the de-multiplex mirror is a pick-off mirror positioned along the optical path and in substantial alignment with the second segment of the segmented window, the pick-off mirror configured to reflect the second spectral band.

In various examples, the foreoptics is an unobscured telescope configured to define a real exit pupil, and the optical de-multiplexer is positioned at the real exit pupil. In some examples, the foreoptics is an unobscured telescope configured to define a real entrance pupil, and the segmented window is positioned at the real entrance pupil. According to various examples, the first spectral band and the second spectral band collectively span a spectral range from 0.4 micrometers to 14 micrometers. According to at least one example, the first spectral band includes the long-wavelength infrared spectrum and the medium-wavelength infrared spectrum, and the second spectral band includes the short-wavelength infrared spectrum, the near-infrared spectrum, and the visible spectrum.

According to an aspect, provided is a method of collecting broadband electromagnetic radiation. In one example, the method comprises receiving electromagnetic radiation at an annularly segmented window, the annularly segmented window including at least a first segment formed from a first material and a second segment formed from a second material, transmitting a first spectral band of the electromagnetic radiation through the first segment and along an optical path, the first segment being shaped as an annulus surrounding the second segment, transmitting a second spectral band of the electromagnetic radiation through the second segment and along the optical path, and spatially de-multiplexing the first spectral band and the second spectral band.

In various examples, receiving the electromagnetic radiation includes receiving electromagnetic radiation over a spectral range of 0.4 micrometers to 14 micrometers. In at least one example, transmitting the first spectral band includes transmitting the long-wavelength infrared spectrum and the medium-wavelength infrared spectrum, and transmitting the second spectral band includes transmitting the short-wavelength infrared spectrum, the near-infrared spectrum, and the visible spectrum.

According to various examples, spatially de-multiplexing the first spectral band and the second spectral band includes transmitting one of the first spectral band and the second spectral band and reflecting the other of the first spectral band and the second spectral band. In at least one example, spatially de-multiplexing the first spectral band and the second spectral band includes transmitting the second spectral band through a central aperture in an annular mirror, and reflecting the first spectral band at a surface of the annular mirror. In another example, spatially de-multiplexing the first spectral band and the second spectral band includes reflecting the second spectral band at a pick-off mirror positioned along the optical path and in substantial alignment with the second segment of the annularly segmented window.

In certain examples, the method further comprises receiving the first spectral band along a first imaging optical path at a first imaging assembly and focusing the first spectral band onto a first optical receiver, and receiving the second spectral band along a second imaging optical path at a second imaging assembly and focusing the second spectral band on a second optical receiver.

According to another aspect, provided is a broadband imaging system. In one example, the broadband imaging system includes a centrally unobscured telescope positioned along an optical path and configured to define an entrance pupil and a real exit pupil, an annularly segmented window positioned at the entrance pupil to receive electromagnetic radiation, the annularly segmented window having an outer ring formed from a first material and a center portion formed from a second material, the outer ring being configured to transmit a first spectral band of the electromagnetic radiation along the optical path and the center portion being configured to transmit a second spectral band of the electromagnetic radiation along the optical path, an optical de-multiplexer positioned along the optical path at the real exit pupil, the optical de-multiplexer configured to spatially separate the first spectral band and the second spectral band, and a first imaging assembly including first focusing optics and a first optical receiver, the first focusing optics positioned to receive one of the first spectral band and the second spectral band from the optical de-multiplexer and focus the one of the first spectral band and the second spectral band onto the first optical receiver.

In various examples, the optical de-multiplexer is an annular mirror having a central aperture, and the annular mirror is positioned to transmit the second spectral band through the central aperture and reflect the first spectral band. In some examples, the broadband imaging system further comprises a second imaging assembly including second focusing optics and a second optical receiver, the second focusing optics positioned to receive the other of the first spectral band and the second spectral band from the optical de-multiplexer and focus the other of the first spectral band and the second spectral band at the second optical receiver. In a further example, the first focusing optics are positioned to collect the one of the first spectral band and the second spectral band from the optical de-multiplexer along a first imaging optical path, the first focusing optics having a first f-number, and the second focusing optics are positioned to collect the other of the first spectral band and the second spectral band from the optical de-multiplexer along a second imaging optical path, the second focusing optics having a second f-number.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
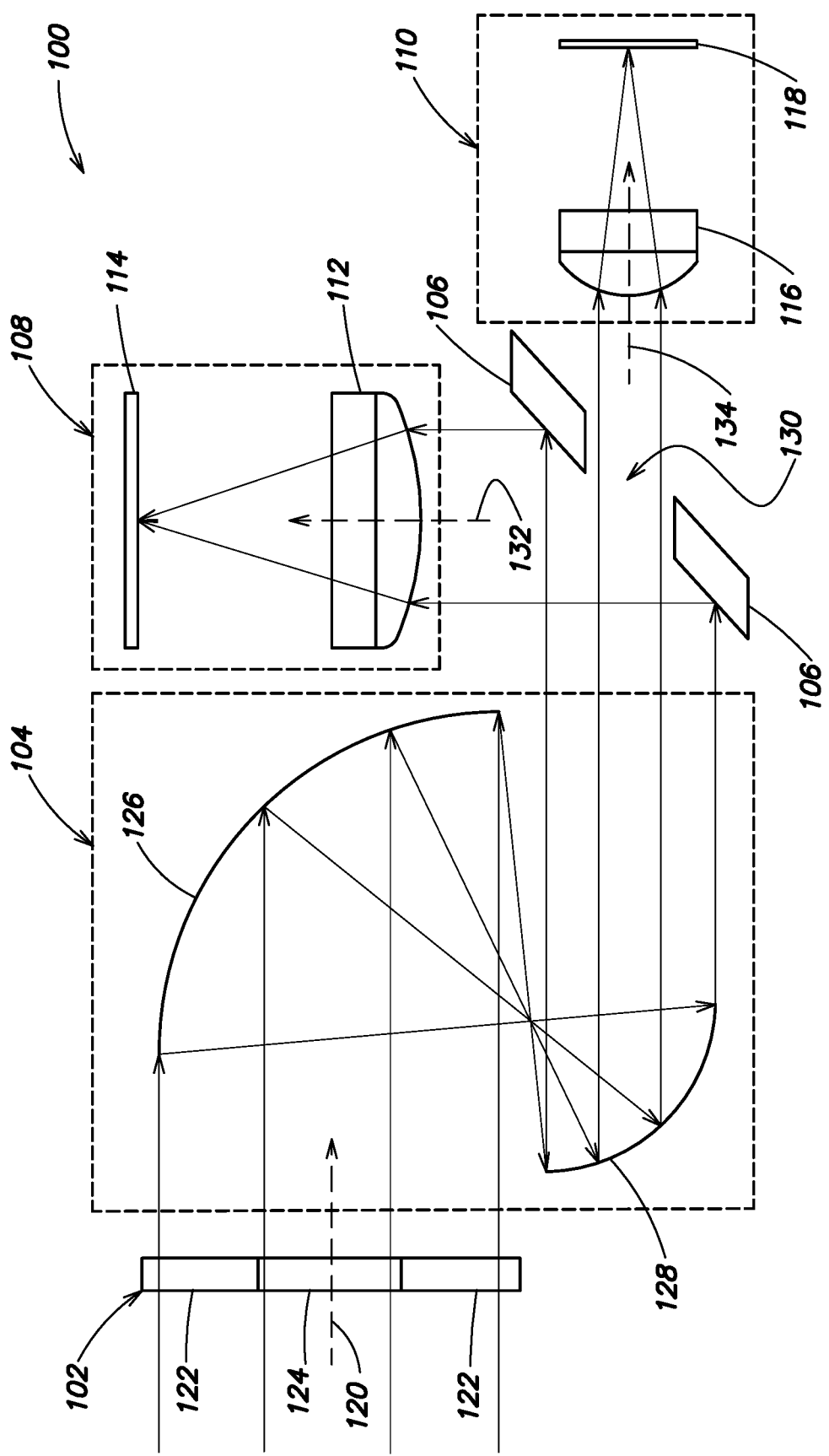
FIG. 1 is an optical arrangement of a broadband optical system according to various examples discussed herein.

Aspects and embodiments are generally directed to broadband optical systems and methods for collecting a wide spectral range of electromagnetic radiation with a single window optical assembly. Examples of the broadband optical system may include a segmented window that is arranged to receive multiple spectral bands of electromagnetic radiation at corresponding segments of the segmented window. In particular, each segment of the segmented window may be formed from a material optimized for a particular subset of the electromagnetic spectrum. When combined, the segments of the segmented window are configured to collectively provide wide spectral coverage.

Optical systems designed for aerial platforms, space-based platforms, maritime platforms, or other vehicle-based platforms can experience extreme pressure, temperature, and directional forces during the operation of the optical system. These environmental conditions can have undesirable effects on exposed optical elements. Accordingly, open aperture optical systems are generally unsuitable for these imaging applications. While typical window designs provide some protection for delicate optical components, typical arrangements require a compromise between spectral coverage and system performance. For instance, some arrangements include a transparent window that shields delicate components, but limits the spectral coverage of the system. In particular, the window is limited by the spectrally transmissive properties of the window material. Other arrangements include multiple windows and associated foreoptic assemblies, which add size, weight, and complexity to the associated optical system.

Accordingly, examples of the optical systems described herein include a segmented window that protects other components of the optical system, while also permitting collection of a wide spectral range of electromagnetic radiation. In one particular example, the segmented window includes an outer ring formed from a first material transmissive to a first spectral band of the electromagnetic radiation and a center portion formed from a second material transmissive to a second portion of the electromagnetic radiation. Accordingly, the first material and the second material may be selected such that the overall window can provide wide spectral coverage and allow broadband or multiband imaging operations without significant additions to the size, weight, power consumption, and/or cost of the optical system.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, there is illustrated an optical arrangement of a broadband optical system 100 according to various examples discussed herein. While in some examples, the broadband optical system 100 may be configured for airborne applications, in certain other examples, the system 100 may be configured for space-based platforms, maritime platforms, and other vehicle-based platforms that experience environmental conditions that may affect the performance of optical imaging operations.

As illustrated in FIG. 1, the broadband optical system ("optical system") 100 may include a segmented window 102, foreoptics 104, and an optical de-multiplexer 106. In certain examples, the broadband optical system 100 may additionally include one or more imaging components, and/or may be integrated within an imaging system that includes one or more imaging components. For instance, the optical system 100 may further include one or more imaging assemblies having focusing optics and an optical receiver. In the illustrated example of FIG. 1, the optical system 100 includes a first imaging assembly 108 including first focusing optics 112 and a first optical receiver 114, and a second imaging assembly 110 including second focusing optics 116 and a second optical receiver 118. Accordingly, in certain implementations, the broadband optical system 100 may perform broadband or multiband imaging or spectroscopy operations.

The segmented window 102 is positioned to receive electromagnetic radiation and direct the electromagnetic radiation along an optical path 120 in a direction of the foreoptics 104. In particular, the segmented window 102 may be positioned at a real entrance pupil of the optical system 100 that is defined by the foreoptics 104. Each segment of the segmented window 102 may be formed from a material optimized for a particular spectral band of the received electromagnetic spectrum. That is, each segment of the segmented window 102 may be formed from a material that transmits a desired spectral band of the received electromagnetic radiation. While in one example, each segment is formed from a material that is optimized for a different spectral band, and in certain examples one or more of the spectral bands may completely or partially overlap. In various examples, the segmented window 102 is configured to provide broad spectral coverage for broadband hyperspectral image applications, such as those generally associated with airborne platforms. For instance, the segmented window 102 may receive and transmit electromagnetic radiation that spans a spectral range of 0.4 micrometers to 14.0 micrometers. Each spectral band transmitted by a respective segment of the segmented window 102 may include a spectral band within this range, such as one or more of the long-wavelength infrared spectrum, the medium-wavelength infrared spectrum, the short-wavelength infrared spectrum, the near-infrared spectrum, and the visible spectrum.

As illustrated in FIG. 1, in certain examples the segmented window 102 includes a first segment 122 and a second segment 124. Each of the first segment 122 and second segment 124 receive the electromagnetic radiation and transmit a respective spectral band of the electromagnetic radiation along the optical path 120 in the direction of the foreoptics 104. FIG. 1 illustrates the first segment 122 transmitting a first spectral band to the foreoptics 104 and the second segment 124 transmitting a second spectral band to the foreoptics 104. However, in certain other examples the segmented window 102 is not limited to the two illustrated segments 122, 124 and may instead have three or more segments. It is appreciated that the number of segments within the segmented window 102 may be adapted to the particular application of the optical system 100, and may be designed based on the intended imaging operations of the optical system 100. Each segment may be adhered to the other segments using an adhesive or other suitable bonding compound. In certain other examples, the segments may be held in place by a pressure applied on the segments by a supporting structure for the segmented window 102 (e.g., a frame, bracket, etc.).

Figure 2:
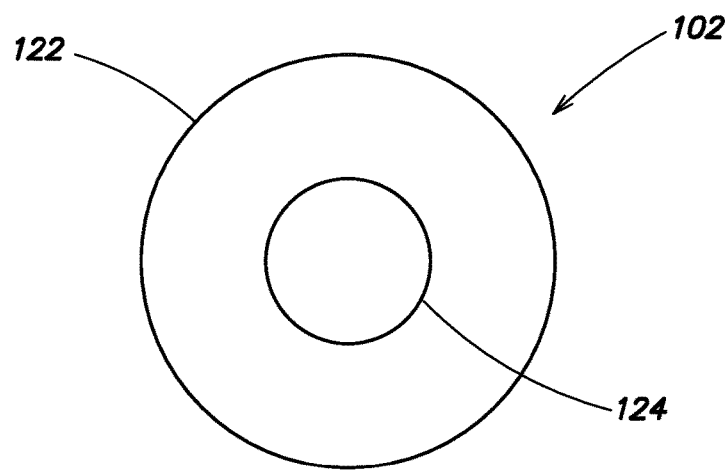
FIG. 2 is a profile view of a segmented window according to various examples discussed herein.

Referring to FIG. 2, illustrated is profile view of the segmented window 102 shown in FIG. 1. As shown, in one example segmented window 102 has a circular profile and the first segment 122 is shaped as an annulus (e.g., outer ring) surrounding the second segment 124. In one example, the first segment 122 is transmissive to the long-wavelength infrared spectrum and the medium-wavelength infrared spectrum, and the second segment 124 is transmissive to the short-wavelength infrared spectrum, the near-infrared spectrum, and the visible spectrum. For instance, the first segment 122 may be formed from zinc selenide (ZnSe), and the second segment 124 may be formed from optical quartz or a fused silica material such as Infrasil® and Suprasil® offered by Thorlabs® of Newton, N.J. Various other examples of materials that may be used for one or more segments of the segmented window include zinc sulfide (ZnS), synthetic diamond, sodium chloride (NaCl), potassium bromide (KBr), potassium chloride (KCl), and barium fluoride (BaF$_2$), to name a few.

While illustrated in FIG. 2 as including a first segment 122 shaped as an annulus, and a second segment 124 shaped as a center portion within the annulus, in various other examples the segmented window 102 may have one or more segments that have a shape different from those in the illustrated example. For instance, in one implementation the segmented window 102 may have a rectilinear profile and may have a first segment shaped as a first rectangular portion of the rectilinear profile and a second segmented shaped as a remaining portion of the rectilinear profile. In another implementation, the segmented window 102 may have a rectilinear profile and may include a plurality of segments arranged in a "checkerboard" pattern. In still another example, the segmented window 102 may have a circular shape with a first segment defined as a first sector (e.g., area between the circumference and two radii of the circular shape) and a second segment defined as the remaining area of the circular shape. Various additional segments may be added as additional sectors. Accordingly, while FIG. 2 illustrates one possible arrangement of a segmented window 102, various other configurations are within this scope of this disclosure.

Referring again to FIG. 1, electromagnetic radiation received at the segmented window 102, and in particular, each segment of the segmented window 102, is transmitted along the common optical path 120 to the foreoptics 104. In various examples, the foreoptics 104 includes an arrangement of mirrors, lenses, or mirror and lenses that collimate and direct the electromagnetic radiation (e.g., the first spectral band and the second spectral band) to the optical de-multiplexer 106. In at least one example, the foreoptics 104 may be configured to define a real entrance pupil and a real exit pupil. In the shown example, the segmented window 102 is positioned at the real entrance pupil and the optical de-multiplexer 106 is positioned at the real exit pupil. In such an example, placement of the segmented window 102 at the real entrance pupil, and placement of the optical de-multiplexer 106 at the real exit pupil, ensures that the first spectral band and the second spectral band are separated across the entire field of view of the broadband optical system 100, without any vignetting at the segmented window 102 or the optical de-multiplexer 106.

In one example, the foreoptics 104 is a centrally unobscured telescope composed of an arrangement of all-reflective optical elements. For instance, in FIG. 1 the foreoptics 104 is illustrated as a centrally unobscured telescope including a primary mirror 126 and a secondary mirror 128. In FIG. 1, electromagnetic radiation transmitted from the first segment 122 (e.g., the first spectral band) and the second segment 124 (e.g., the second spectral band) is received at the primary mirror 126. The primary mirror 126 directs the electromagnetic radiation along the optical path 120 in a direction of the secondary mirror 128. The secondary mirror 128 is positioned to receive the electromagnetic radiation directed by the primary mirror 126, and direct the electromagnetic radiation along the optical path 120 in a direction of the optical de-multiplexer 106. It is appreciated that FIG. 1 illustrates one exemplary arrangement of a centrally unobscured telescope for the purpose of illustration, and in various other examples the centrally unobscured telescope may include additional optical elements (e.g., mirrors and/or lenses) and may be arranged in a different manner. It is further appreciated that in various other examples the arrangement of the foreoptics 104 may depend on the particular arrangement of the segmented window 102. For instance, the illustrated centrally unobscured telescope offers the benefit of collecting unobscured electromagnetic radiation from the center portion of the segmented window 102. Similar adjustments may be made to the foreoptics 104 based on the other segmented window arrangements, as discussed herein.

Referring to FIG. 1, the optical de-multiplexer 106 is positioned along the optical path 120 and configured to spatially separate the first spectral band and the second spectral band. In FIG. 1, the optical de-multiplexer 106 is a de-multiplex mirror positioned in the optical path 120 to transmit one of the first spectral band and the second spectral band, and reflect the other of the first spectral band and the second spectral band. In the example in which the first segment 122 is shaped as an annulus surrounding the second segment 124, the de-multiplex mirror may be an annular mirror having a central aperture (e.g., aperture 130). As illustrated in FIG. 1, the de-multiplex mirror may be positioned to transmit the spectral band received from the second segment 124 of the segmented window 102 (i.e., the second spectral band) through the central aperture 130, and reflect the spectral band received from the first segment 122 of the segmented window 102 (e.g., the first spectral band).

Figures 3, 4:
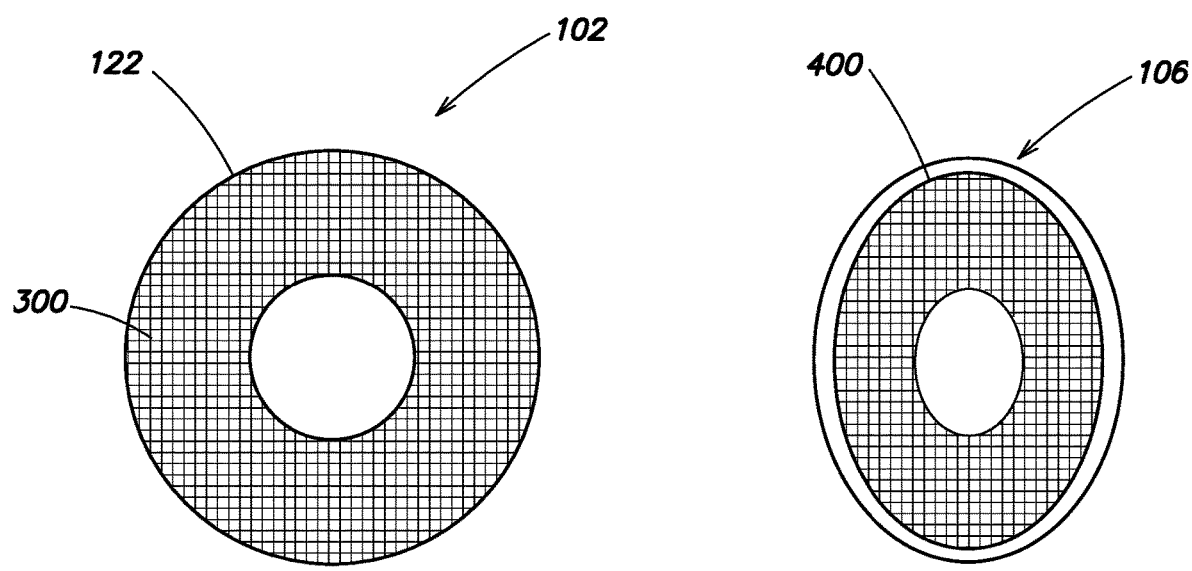
FIG. 3 is a diagram of electromagnetic radiation incident on a surface of an annulus-shaped segment of a segmented window of the broadband optical system illustrated in FIG. 1, according to various examples discussed herein.
FIG. 4 is a diagram of electromagnetic radiation incident on a surface of an optical de-multiplexer of the broadband optical system illustrated in FIG. 1, according to various examples discussed herein.

Referring to FIG. 3, illustrated is a diagram of electromagnetic radiation incident on a surface of the first segment 122 (e.g., annulus-shaped segment) of the segmented window 102 illustrated in FIG. 1. In particular, FIG. 3 illustrates the pattern (e.g., pattern 300) that the first spectral band of the electromagnetic radiation forms on the surface of first segment 122. FIG. 4 illustrates a diagram of the electromagnetic radiation incident on a surface of an example of the optical de-multiplexer 106 illustrated in FIG. 1. In particular, FIG. 4 illustrates an example in which the optical de-multiplexer 106 is an annular mirror, the electromagnetic radiation being received at a reflective surface of the annular mirror. That is, FIG. 4 illustrates the pattern (e.g., pattern 400) that the first spectral band of the electromagnetic radiation forms on the reflective surface of the annular mirror when the first segment 122 is shaped as an annulus. As illustrated in FIG. 1, and further described below, the optical de-multiplexer 106 may be positioned to direct the first spectral band and the second spectral band along spatially separated imaging optical paths. In one example, the optical de-multiplexer 106 is positioned at an angle (e.g., 45 degree angle) relative to the optical path 120 to achieve this separation. The optical de-multiplexer 106 illustrated in FIG. 4 has an ellipsoidal shape to demonstrate an example of a tilt (i.e., angle) of the optical de-multiplexer 106 relative to the optical path 120.

Figure 5:
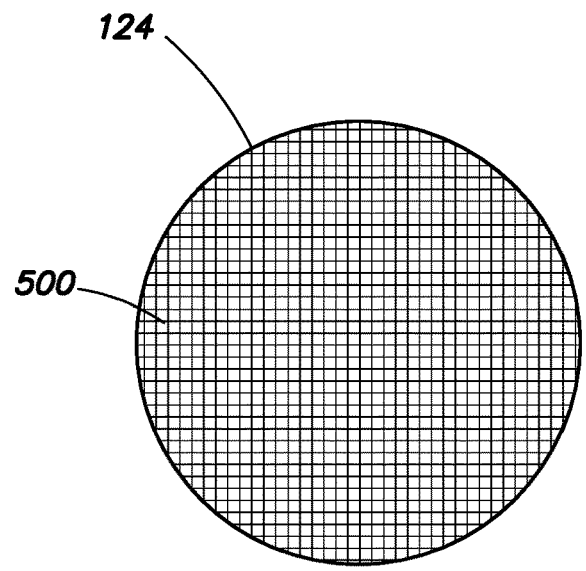
FIG. 5 is a diagram of electromagnetic radiation incident on a surface of a center portion segment of a segmented window of the broadband optical system illustrated in FIG. 1, according to various examples discussed herein.
Figure 6:
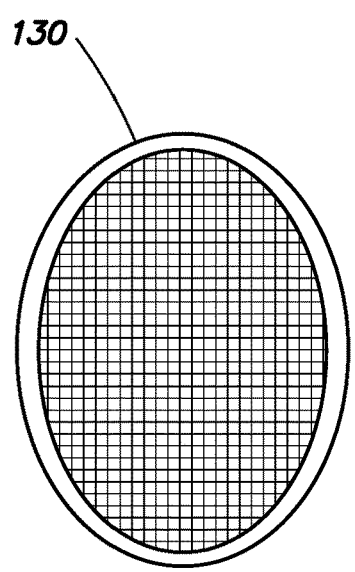
FIG. 6 is a diagram of electromagnetic radiation transmitted through a central aperture of an example of an optical de-multiplexer of the broadband optical system illustrated in FIG. 1, according to various examples discussed herein.

Referring to FIG. 5, illustrated is a diagram of electromagnetic radiation incident on a surface of the second segment 124 (e.g., center portion) of the segmented window 102 illustrated in FIG. 1. In particular, FIG. 5 illustrates the pattern (e.g., pattern 500) that the second spectral band of the electromagnetic radiation forms on the surface of the second segment 124. FIG. 6 illustrates a diagram of electromagnetic radiation transmitted through an example of the optical de-multiplexer 106 illustrated in FIG. 1. In particular, FIG. 6 illustrates an example in which the optical de-multiplexer 106 is an annular mirror having a central aperture 130, the electromagnetic radiation being transmitted through the central aperture 130. As illustrated in FIG. 1, and further described below, the optical de-multiplexer 106 may be positioned to direct the first spectral band and the second spectral band along spatially separated imaging optical paths. In one example, the optical de-multiplexer 106 is positioned at an angle (e.g., 45 degree angle) relative to the optical path 120 to achieve this separation. The optical de-multiplexer 106 illustrated in FIG. 6 has an ellipsoidal shape to demonstrate an example of a tilt (i.e., angle) of the optical de-multiplexer 106 relative to the optical path 120.

As shown in FIG. 3, FIG. 4, FIG. 5, and FIG. 6, the foreoptics 104 maintains the spatial profiles of the first spectral band and the second spectral band when directing the first spectral band and the second spectral band from the segmented window 102 to the optical de-multiplexer 106 such that the optical de-multiplexer 106 may spatially de-multiplex the electromagnetic radiation to separate the first spectral band and the second spectral band. In various examples, the optical prescription of the foreoptics 104 is selected to achieve minimal beam divergence as the electromagnetic radiation propagates along the optical path 120 to the optical de-multiplexer 106.

Figure 7:
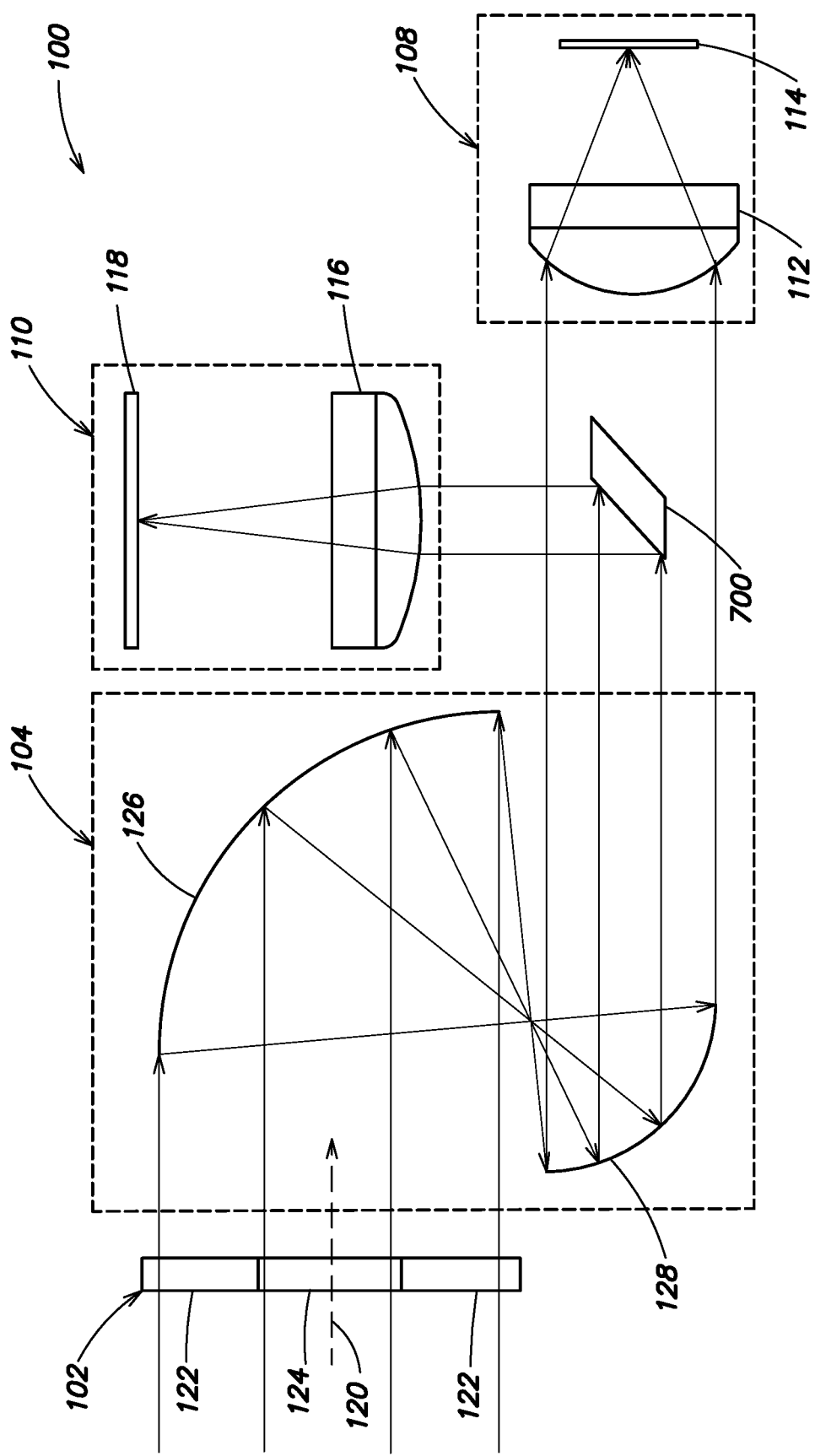
FIG. 7 is another optical arrangement of a broadband optical system according to various examples discussed herein.

In certain other examples, the optical de-multiplexer 106 is a pick-off mirror positioned in the optical path 120 to reflect one of the first spectral band and the second spectral band and transmit the other of the first spectral band and the second spectral band. FIG. 7 illustrates one example of the optical system 100 in which the optical de-multiplexer 106 is a pick-off mirror 700. In the example in which the first segment 122 of the window 102 is shaped as an annulus surrounding the second segment 124, the pick-off mirror 700 may be positioned to transmit the spectral band received from the first segment 122 of the segmented window 102 (i.e., the first spectral band), and reflect the spectral band received from the second segment 124 of the segmented window 102 (i.e., the second spectral band). In particular, the pick-off mirror 700 may be positioned along the optical path in substantial alignment with the second segment of the segmented window 102.

By de-multiplexing the received electromagnetic radiation spatially, the optical system 100 avoids insertion losses and additional thermal background flux that may otherwise degrade the performance of the optical system 100. However, in certain other instances, the optical de-multiplexer 106 may be a dichroic beamsplitter configured to spectrally de-multiplex the received electromagnetic radiation based on the wavelength(s) of the received spectral bands (e.g., first spectral band and second spectral band).

Referring again to FIG. 1, in various examples the optical de-multiplexer 106 is configured to direct the spatially separated spectral bands of the electromagnetic radiation to one or more imaging assemblies. In one example, the optical de-multiplexer 106 is configured to direct the first spectral band along a first imaging optical path 132 to the first imaging assembly 108 and direct the second spectral band along a second imaging optical path 134 to the second imaging assembly 110. In an example where the segmented window 102 includes more than two segments, the optical system 100 may include an imaging assembly that corresponds to each segment (and associated spectral band), and the optical de-multiplexer 106 may direct the associated spectral band along a corresponding imaging optical path.

In various examples, each imaging assembly 108, 110 may include focusing optics and an optical receiver. In FIG. 1, the optical system 100 is illustrated as including a first imaging assembly 108 that includes first focusing optics 112 and a first optical receiver 114, and a second imaging assembly 110 that includes second focusing optics 116 and a second optical receiver 118. The first imaging assembly 108 is positioned along the first imaging optical path 132 and the second imaging assembly 110 is positioned along the second imaging optical path 134. Each of the focusing optics 112, 116 may include an arrangement of one or more mirrors, lenses, or mirrors and lenses. FIG. 1 illustrates each of the first focusing optics 112 and second focusing optics 116 as including a series of lenses. The focusing optics 112, 116 are positioned within the respective imaging optical path to receive a spectral band of the electromagnetic radiation from the optical de-multiplexer 106 and focus that spectral band on the corresponding optical receiver 114, 118. As shown in FIG. 1, the first focusing optics 108 receives the first spectral band from the optical de-multiplexer 106 and directs the first spectral band to the first optical receiver 114. Similarly, the second focusing optics 116 receives the second spectral band from the optical de-multiplexer 106 and directs the second spectral band to the second optical receiver 118.

In various examples, each of the optical receivers 114, 118 may include any suitable detector sensitive to wavelengths within the electromagnetic spectrum, or a subset of the electromagnetic radiation. For example, each optical receiver 114, 118 may include an imaging array positioned at a focal plane of the optical system 100. In one example, each of the first optical receiver 114 and the second optical receiver 118 are a focal plane array, such as a charge coupled device (CCD) or complementary metal-oxide semiconductor (CMOS) sensor. Each optical receiver 114, 118 may include a plurality of photodetectors (e.g., pixels) that collect the received spectral band. Based on the flux of the received spectral band, each optical receiver 114, 118 may generate one or more images.

As described, in certain instances the optical system 100 may include a first imaging assembly 108 with first focusing optics 112, and a second imaging assembly 110 with second focusing optics 116. Accordingly, in certain instances each imaging assembly 108, 110 may have a different f-number. In particular, the f-number of each imaging assembly 108, 110 may be adjusted such that each imaging assembly 108, 110 has about the same spatial resolution (e.g., diffraction effect) despite a difference in the wavelengths of the spectral bands received. For example, as a result of the larger aperture of the first segment 122 (e.g., the annulus shape) relative to the second segment 124, the first focusing optics 112 may have a faster f-number than the focusing optics 116 of the second imaging assembly 110. Such an arrangement may account for higher optical diffraction, which may be present in the long-wavelength infrared spectrum and the medium-wavelength infrared spectrum, for example. Moreover, such an arrangement permits a higher telescope wavefront error for less impacted spectral bands (e.g., the long-wavelength infrared spectrum and the medium-wavelength infrared spectrum). In one example, the first optical receiver 114 may include a f/1.0 long-wavelength infrared spectrum and medium-wavelength infrared spectrum sensor, and the second optical receiver 118 may include a f/2.5 short-wavelength infrared spectrum, near-infrared spectrum, and visible spectrum sensor.

While the first spectral band and the second spectral band are illustrated in FIG. 1 as being directed by the optical de-multiplexer 106 to dedicated imaging systems (e.g., the first imaging system 108 and the second imaging system 110), in various other examples, the first spectral band and the second spectral band may be directed to different portions of a shared imaging system. For instance, a first set of focusing optics may focus the second spectral band on a first area of an optical receiver, and a second set of focusing optics may focus the first spectral band on a second area of the optical receiver. While described herein as imaging assemblies, in various other examples the imaging assemblies may be replaced with spectrometer assemblies.

Figure 8:
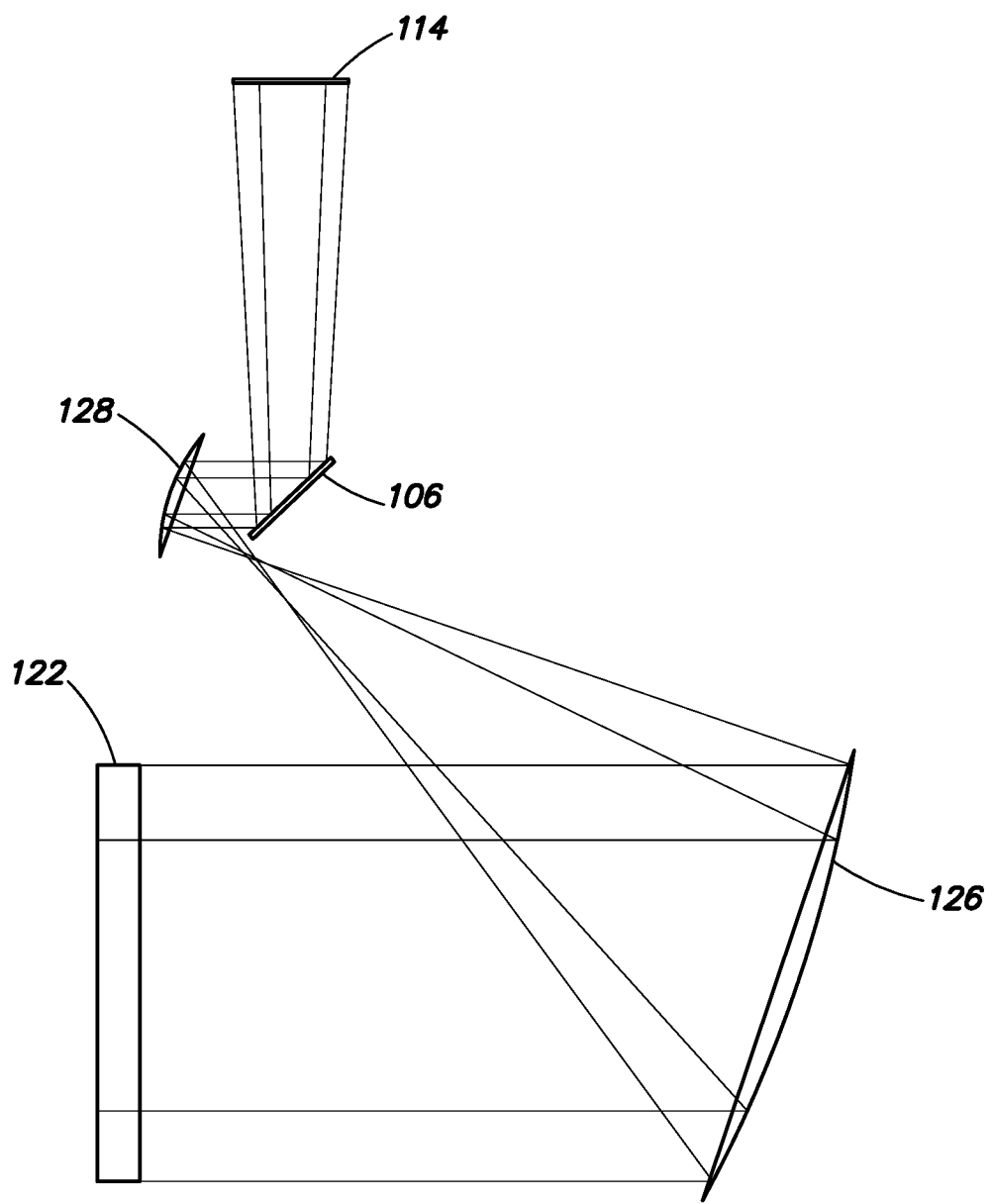
FIG. 8 is a ray trace diagram of electromagnetic radiation directed to an optical receiver of the broadband optical system illustrated in FIG. 1, according to various examples discussed herein.

Referring to FIG. 8, illustrated is a ray trace diagram of the first spectral band of the electromagnetic radiation received at the segmented window 102 and directed along the optical path 120 and first imaging optical path 132 to the first optical receiver 114 of the first imaging assembly 108. As shown, the first spectral band is transmitted through the first segment 122 and along the optical path 120 in the direction of the foreoptics primary mirror 126. The foreoptics primary mirror 126 directs the first spectral band along the optical path 120 in the direction of the foreoptics secondary mirror 128. The foreoptics secondary mirror 128 receives the first spectral band from the foreoptics primary mirror 126 and directs the first spectral band along the optical path 120 in a direction of the optical de-multiplexer 106 (e.g., illustrated annular mirror). The first spectral band is received by the optical de-multiplexer 106 and reflected along the first imaging optical path 132 in a direction of the first optical receiver 114.

Figure 9:
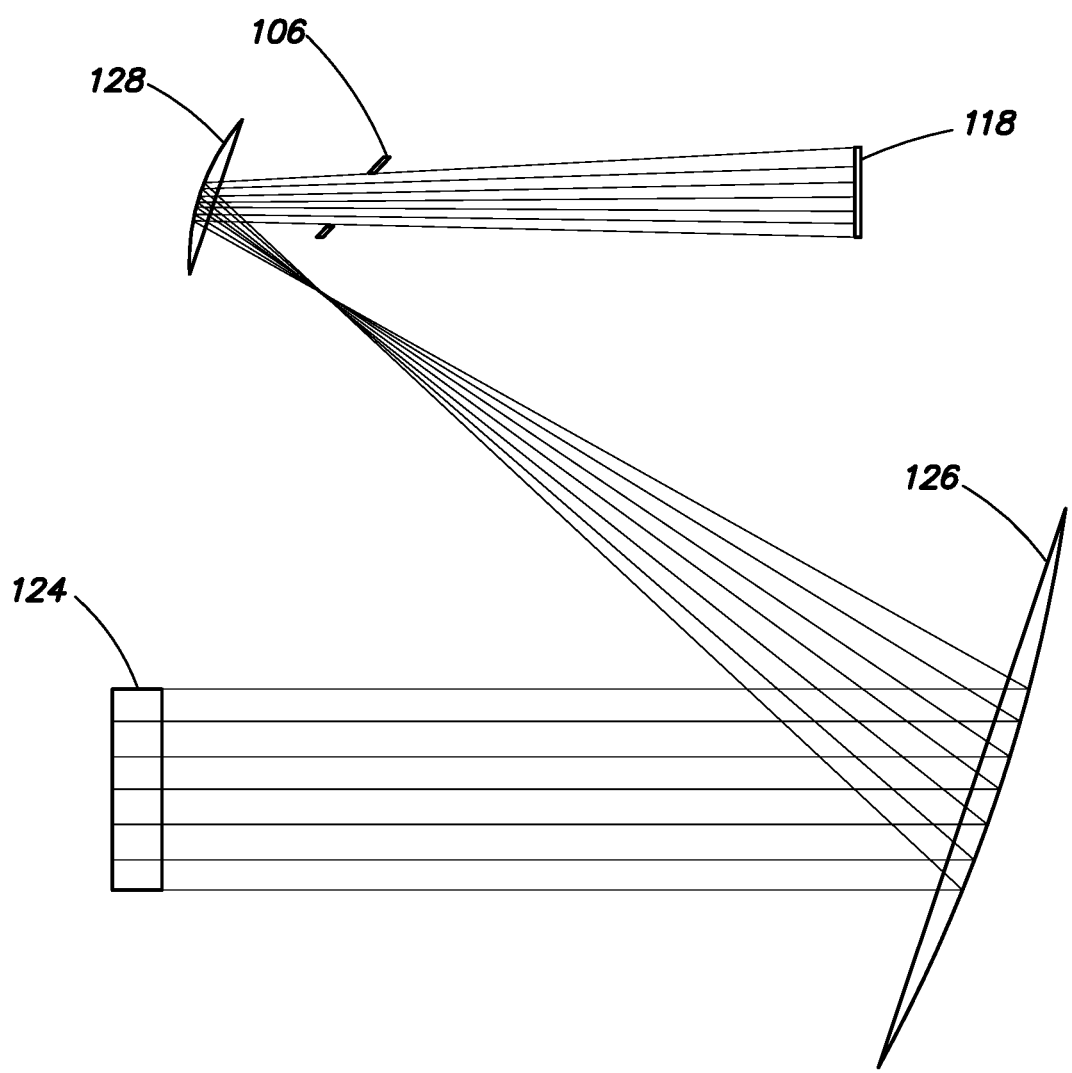
FIG. 9 is a ray trace diagram of electromagnetic radiation directed to another optical receiver of the broadband optical system illustrated in FIG. 1, according to various examples discussed herein.

Similar to FIG. 8, FIG. 9 illustrates a ray trace diagram of the second spectral band of the electromagnetic radiation received at the segmented window 102 and directed along the optical path 120 and the second imaging optical path 134 to the second optical receiver 118 of the second imaging assembly 110. As shown, the second spectral band is transmitted through the second segment 124 and along the optical path 120 in the direction of the foreoptics primary mirror 126. The foreoptics primary mirror 126 directs the second spectral band along the optical path 120 in the direction of the foreoptics secondary mirror 128. The foreoptics secondary mirror 128 receives the second spectral band from the foreoptics primary mirror 126 and directs the second spectral band along the optical path 120 in a direction of the optical de-multiplexer 106 (e.g., illustrated annular mirror). The second spectral band is received by the optical de-multiplexer 106 and transmitted onto the second optical receiver 118. While not illustrated in FIGS. 8 and 9, as described above, in certain examples the focusing optics (e.g., the first focusing optics 112 and the second focusing optics 116) may receive the first spectral band and the second spectral band and focus the first spectral band and the second spectral band on the respective optical receivers 114, 118.

Figure 10:
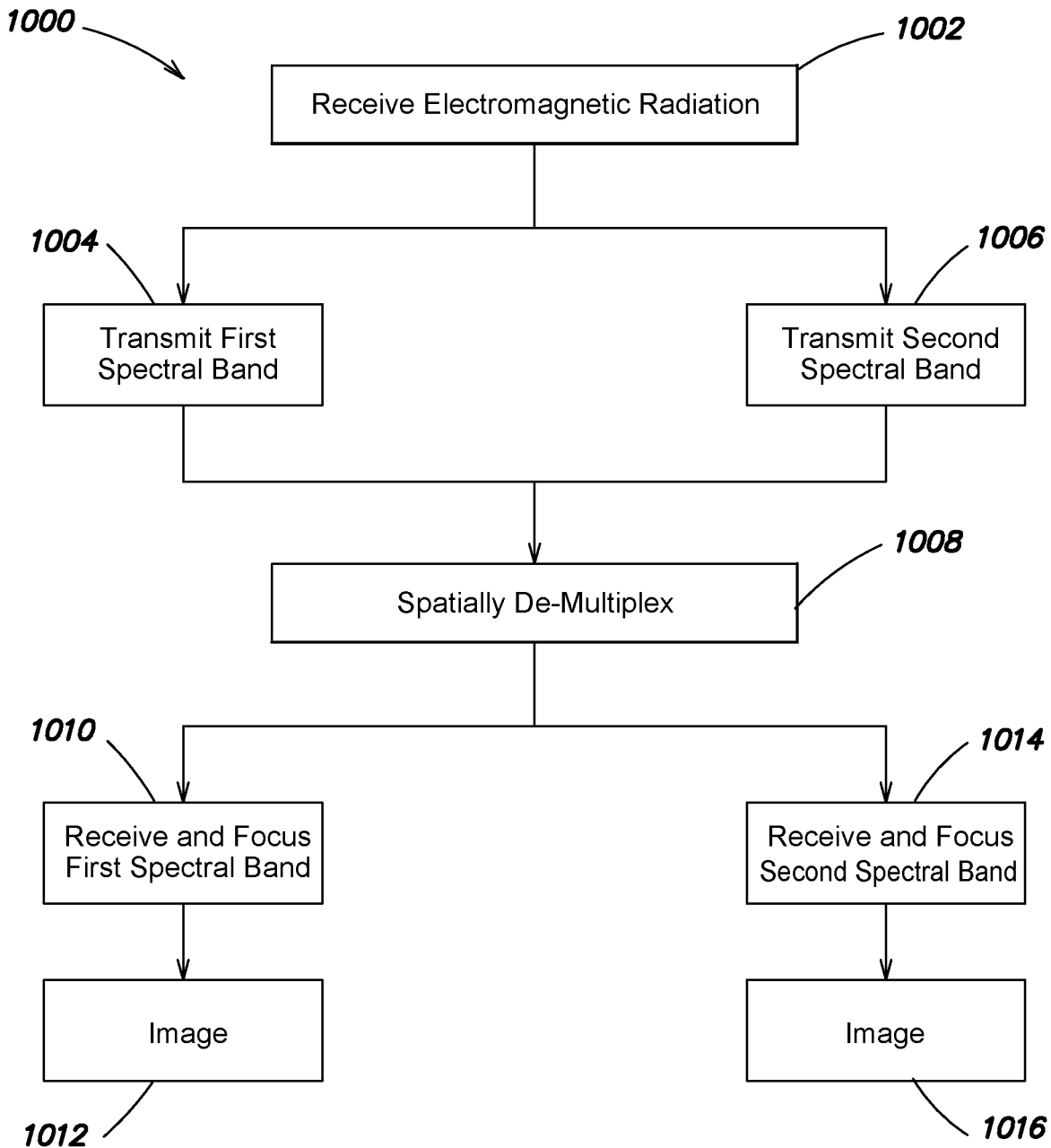
FIG. 10 is a process flow for collecting broadband electromagnetic radiation, according to various examples discussed herein.

As described above with reference to FIGS. 1-9, several examples perform processes for collecting broadband or multiband electromagnetic radiation. In some examples, these processes are executed by operating a broadband optical system, such as the optical system described above with reference to FIGS. 1-9. One example of such a process 1000 is illustrated in FIG. 10. Process 1000 may include the acts of receiving electromagnetic radiation, transmitting at least a first spectral band and a second spectral band of the electromagnetic radiation, spatially de-multiplexing the first spectral band and the second spectral band, focusing the first spectral band and the second spectral band, and generating one or more images. The process 1000 of FIG. 10 is described with continuing reference to the optical system 100 illustrated in FIG. 1.

In act 1002 the process 1000 may include receiving electromagnetic radiation at the segmented window 102, the segmented window 102 including at least a first segment 122 formed from a first material and a second segment 124 formed from a second material. The process 1000 may then include transmitting a first spectral band of the electromagnetic radiation through the first segment 122 and along the optical path 120, and transmitting a second spectral band of the electromagnetic radiation through the second segment 124 and along the optical path 120 (act 1004 and act 1006).

As discussed above with reference to at least FIG. 1, in many examples the first segment 122 is shaped as an annulus that surrounds the second segment 124. The first segment 122 may be transmissive to the long-wavelength infrared spectrum and the medium-wavelength infrared spectrum, and the second segment 124 may be transmissive to the short-wavelength infrared spectrum, the near-infrared spectrum, and the visible spectrum In various examples, the process 1000 includes receiving the electromagnetic radiation (e.g., the first spectral band and second spectral band) along the optical path 120 at the foreoptics 104. As also described above, the foreoptics 104 includes an arrangement of mirrors, lenses, or mirrors and lenses that collimate and direct the electromagnetic radiation. Accordingly, in various examples, the process 1000 may include directing the electromagnetic radiation from the segmented window 102 to the optical de-multiplexer 106 with the foreoptics 104. In particular, acts for directing the first spectral band and the second spectral band to the optical de-multiplexer 106 with the foreoptics 104 may include one or more acts for maintaining a spatial profile of the first spectral band and second spectral band to minimize the beam divergence of the electromagnetic radiation at the optical de-multiplexer 106.

In act 1008, the process 1000 may include spatially de-multiplexing the first spectral band and the second spectral band. Spatially de-multiplexing the first and second spectral bands may include transmitting one of the first spectral band and the second spectral band and reflecting the other of the first spectral band and the second spectral band. For example, act 1008 may include transmitting the second spectral band through a central aperture 130 in an annular mirror 106, and reflecting the first spectral band at a surface of the annular mirror 106. However, in certain other examples, act 1008 may include reflecting the second spectral band at a pick-off mirror 700 (shown in FIG. 7) positioned along the optical path 120 and in substantial alignment with the second segment 124 of the segmented window 102.

In act 1010, the process 1000 may include receiving the first spectral band along the first imaging optical path 132 at the first imaging assembly 108 and focusing the first spectral band onto the first optical receiver 114. Similarly, act 1014 may include receiving the second spectral band along the second imaging optical path 134 at the second imaging assembly 110 and focusing the second spectral band on the second optical receiver 118. Various acts for receiving and focusing the first spectral band and second spectral band may be performed by the focusing optics 112 and focusing optics 116 illustrated in FIG. 1. Responsive to receiving the first spectral band at the first optical receiver 114, the process 100 may include the act 1012 of generating an image based on the received first spectral band. Similarly, in response to receiving the second spectral band at the second optical receiver 118, the process 1000 may include the act 1016 of generating an image based on the received second spectral band. While not explicitly illustrated in FIG. 10, process 1000 may include various additional acts, such those described above with reference to FIGS. 1-9.

Accordingly, various aspects and embodiments are directed to broadband optical systems and methods for collecting a wide spectral range of electromagnetic radiation with a single segmented window optical assembly. In particular, each segment of the segmented window may be formed from a material optimized for a particular subset of the electromagnetic spectrum. Collectively, each segment of the segmented window is configured to provide wide spectral coverage while also protecting the more sensitive components (e.g., mirrors and/or lenses) of the optical system.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A broadband optical system comprising:
a segmented window positioned to receive electromagnetic radiation, the segmented window including at least a first segment formed from a first material and a second segment formed from a second material, the first segment being configured to transmit a first spectral band of the electromagnetic radiation along an optical path and the second segment being configured to transmit a second spectral band of the electromagnetic radiation along the optical path;
an optical de-multiplexer positioned along the optical path and configured to spatially separate the first spectral band and the second spectral band; and
foreoptics interposed between the segmented window and the optical de-multiplexer and positioned to direct the electromagnetic radiation from the segmented window to the optical de-multiplexer,
wherein the segmented window is circular, and wherein the first segment is shaped as an annulus surrounding the second segment,
wherein the optical de-multiplexer includes a de-multiplex mirror configured to transmit one of the first spectral band and the second spectral band and reflect the other of the first spectral band and the second spectral band, and
wherein the de-multiplex mirror is an annular mirror having a central aperture, and wherein the annular mirror is positioned to transmit the second spectral band through the central aperture and reflect the first spectral band.

2. The broadband optical system of claim 1, wherein the de-multiplex mirror is a pick-off mirror positioned along the optical path and in substantial alignment with the second segment of the segmented window, the pick-off mirror configured to reflect the second spectral band.

3. The broadband optical system of claim 1, wherein the foreoptics is an unobscured telescope configured to define a real exit pupil, and wherein the optical de-multiplexer is positioned at the real exit pupil.

4. The broadband optical system of claim 1, wherein the foreoptics is an unobscured telescope configured to define a real entrance pupil, and wherein the segmented window is positioned at the real entrance pupil.

5. The broadband optical system of claim 1, wherein the first spectral band and the second spectral band collectively span a spectral range from 0.4 micrometers to 14 micrometers.

6. The broadband optical system of claim 5, wherein the first spectral band includes the long-wavelength infrared spectrum and the medium-wavelength infrared spectrum, and the second spectral band includes the short-wavelength infrared spectrum, the near-infrared spectrum, and the visible spectrum.

7. A method of collecting broadband electromagnetic radiation, the method comprising:
receiving electromagnetic radiation at an annularly segmented window, the annularly segmented window including at least a first segment formed from a first material and a second segment formed from a second material;
transmitting a first spectral band of the electromagnetic radiation through the first segment and along an optical path, the first segment being shaped as an annulus surrounding the second segment;
transmitting a second spectral band of the electromagnetic radiation through the second segment and along the optical path; and
spatially de-multiplexing the first spectral band and the second spectral band,
wherein spatially de-multiplexing the first spectral band and the second spectral band includes transmitting one of the first spectral band and the second spectral band and reflecting the other of the first spectral band and the second spectral band, and
wherein spatially de-multiplexing the first spectral band and the second spectral band includes:
transmitting the second spectral band through a central aperture in an annular mirror; and
reflecting the first spectral band at a surface of the annular mirror.

8. The method of claim 7, wherein receiving the electromagnetic radiation includes receiving electromagnetic radiation over a spectral range of 0.4 micrometers to 14 micrometers.

9. The method of claim 8, wherein transmitting the first spectral band includes transmitting the long-wavelength infrared spectrum and the medium-wavelength infrared spectrum, and transmitting the second spectral band includes transmitting the short-wavelength infrared spectrum, the near-infrared spectrum, and the visible spectrum.

10. The method of claim 7, wherein spatially de-multiplexing the first spectral band and the second spectral band includes reflecting the second spectral band at a pick-off mirror positioned along the optical path and in substantial alignment with the second segment of the annularly segmented window.

11. The method of claim 7, the method further comprising:
receiving the first spectral band along a first imaging optical path at a first imaging assembly and focusing the first spectral band onto a first optical receiver; and
receiving the second spectral band along a second imaging optical path at a second imaging assembly and focusing the second spectral band on a second optical receiver.

12. A broadband imaging system comprising:
a centrally unobscured telescope positioned along an optical path and configured to define an entrance pupil and a real exit pupil;
an annularly segmented window positioned at the entrance pupil to receive electromagnetic radiation, the annularly segmented window having an outer ring formed from a first material and a center portion formed from a second material, the outer ring being configured to transmit a first spectral band of the electromagnetic radiation along the optical path and the center portion being configured to transmit a second spectral band of the electromagnetic radiation along the optical path;

an optical de-multiplexer positioned along the optical path at the real exit pupil, the optical de-multiplexer configured to spatially separate the first spectral band and the second spectral band; and a first imaging assembly including first focusing optics and a first optical receiver, the first focusing optics positioned to receive one of the first spectral band and the second spectral band from the optical de-multiplexer and focus the one of the first spectral band and the second spectral band onto the first optical receiver, wherein the optical de-multiplexer is an annular mirror having a central aperture, and wherein the annular mirror is positioned to transmit the second spectral band through the central aperture and reflect the first spectral band.

13. The imaging system of claim 12, further comprising a second imaging assembly including second focusing optics and a second optical receiver, the second focusing optics positioned to receive the other of the first spectral band and the second spectral band from the optical de-multiplexer and focus the other of the first spectral band and the second spectral band at the second optical receiver.

14. The imaging system of claim 13, wherein the first focusing optics are positioned to collect the one of the first spectral band and the second spectral band from the optical de-multiplexer along a first imaging optical path, the first focusing optics having a first f-number, and wherein the second focusing optics are positioned to collect the other of the first spectral band and the second spectral band from the optical de-multiplexer along a second imaging optical path, the second focusing optics having a second f-number.

* * * * *